(12) United States Patent
Park et al.

(10) Patent No.: US 11,889,185 B2
(45) Date of Patent: Jan. 30, 2024

(54) MONITORING SYSTEM AND OPERATION METHOD THEREOF

(71) Applicant: Hanwha Techwin Co., Ltd., Seongnam-si (KR)

(72) Inventors: Dong Jin Park, Seongnam-si (KR); Dae Bong Kim, Seongnam-si (KR); Young Sang Kwon, Seongnam-si (KR); Ki Bum Park, Seongnam-si (KR); Joon Chan Park, Seongnam-si (KR); Young Sub Kim, Seongnam-si (KR)

(73) Assignee: Hanwha Techwin Co., Ltd., Seongnam-si (KR)

( * ) Notice: Subject to any disclaimer, the term of this patent is extended or adjusted under 35 U.S.C. 154(b) by 676 days.

(21) Appl. No.: 17/056,815

(22) PCT Filed: May 24, 2019

(86) PCT No.: PCT/KR2019/006243
§ 371 (c)(1),
(2) Date: Nov. 19, 2020

(87) PCT Pub. No.: WO2019/231174
PCT Pub. Date: Dec. 5, 2019

(65) Prior Publication Data
US 2021/0211571 A1 Jul. 8, 2021

(30) Foreign Application Priority Data
Jun. 1, 2018 (KR) .................. 10-2018-0063525

(51) Int. Cl.
*H04N 23/67* (2023.01)
*G01S 17/08* (2006.01)
*G01S 17/88* (2006.01)

(52) U.S. Cl.
CPC ............. *H04N 23/67* (2023.01); *G01S 17/08* (2013.01); *G01S 17/88* (2013.01)

(58) Field of Classification Search
CPC ............... H04N 5/23212; H04N 9/045; H04N 5/23296; G01S 17/08; G01S 17/88; G03B 13/36; G03B 13/20
(Continued)

(56) References Cited

U.S. PATENT DOCUMENTS

| 8,736,745 B2 | 5/2014 | Yamasaki |
| 2012/0274837 A1 | 11/2012 | Yamasaki |

(Continued)

FOREIGN PATENT DOCUMENTS

| CN | 106559528 | 4/2017 |
| JP | 2003-098422 | 4/2003 |

(Continued)

OTHER PUBLICATIONS

International Search Report dated Sep. 3, 2019, issued in International Application No. PCT/KR2019/006243 (with English Translation).

*Primary Examiner* — Xi Wang
(74) *Attorney, Agent, or Firm* — H.C. Park & Associates, PLC

(57) ABSTRACT

A monitoring system includes a camera module configured to photograph a subject, a laser distance sensor configured to sense a distance to the subject, the laser distance sensor being arranged in a line with the camera module, and a processor configured to acquire a first angle and a first sensing value of the laser distance sensor in response to an event, calculate a first distance between the camera module and the subject by using the first angle and the first sensing value, calculate a second angle by using the first distance, a laser angle of view of the laser distance sensor, and a laser
(Continued)

angle of view length of the laser distance sensor, rotate the laser distance sensor up to the second angle when a difference between the first angle and the second angle exceeds a predetermined range, and acquire a second sensing value of the laser distance sensor.

10 Claims, 4 Drawing Sheets

(58) Field of Classification Search
USPC .......................................................... 348/360
See application file for complete search history.

(56) References Cited

U.S. PATENT DOCUMENTS

| 2017/0017136 | A1 | 1/2017 | Kao et al. |
| 2019/0005668 | A1* | 1/2019 | Sugimura ................. G06T 7/73 |

FOREIGN PATENT DOCUMENTS

| JP | 200-279843 | 10/2003 |
| KR | 10-1997-0056978 | 7/1997 |
| KR | 10-2002-0018514 | 3/2002 |
| KR | 10-2002-0054843 | 7/2002 |
| KR | 10-0403369 | 10/2003 |
| KR | 10-2004-0016231 | 2/2004 |
| KR | 10-0478855 | 3/2005 |
| KR | 10-0763974 | 10/2007 |
| KR | 10-2010-0007444 | 1/2010 |
| KR | 10-1098469 | 12/2011 |
| KR | 10-1163453 | 7/2012 |
| KR | 10-2012-0093380 | 8/2012 |
| KR | 10-1639666 | 7/2016 |
| KR | 10-1762203 | 7/2017 |
| WO | 2011077639 | 6/2011 |

* cited by examiner

MONITORING SYSTEM AND OPERATION METHOD THEREOF

CROSS-REFERENCE TO RELATED APPLICATION

This application is the National Stage Entry of International Application No. PCT/KR2019/006243, filed on May 24, 2019, and claims priority from and the benefit of Korean Patent Application No. 10-2018-0063525, filed on Jun. 1, 2018, both of which are incorporated herein by reference for all purposes as if fully set forth herein.

FIELD OF THE INVENTION

The present disclosure relates to a monitoring system for controlling the focusing of a camera according to a distance to a subject and a method of operating the monitoring system.

DISCUSSION OF THE BACKGROUND

In recent years, cameras are installed inside or outside buildings, or on streets for various purposes such as crime prevention, security, and store management. These cameras may be connected to each other through a wired or wireless network to perform functions as network cameras.

A manager who manages a place where a camera is installed may remotely manage a remote location such as a building or a store by accessing the camera through a personal computer or the like.

In order to more accurately monitor a desired subject, the focusing of the camera may be controlled. The focusing of the camera may be manually controlled by a manager or may be automatically controlled by the camera itself.

The above information disclosed in this Background section is only for understanding of the background of the inventive concepts, and, therefore, it may contain information that does not constitute prior art.

SUMMARY

Provided are a monitoring system for more accurately controlling the focusing of a camera and a method of operating the monitoring system.

Additional features of the inventive concepts will be set forth in the description which follows, and in part will be apparent from the description, or may be learned by practice of the inventive concepts.

According to an aspect of the present disclosure, a monitoring system includes a camera module that photographs a subject, a laser distance sensor that senses a distance to the subject, the laser distance sensor being arranged in a line with the camera module, and a processor that acquires a first angle and a first sensing value of the laser distance sensor in response to an event, calculates a first distance between the camera module and the subject by using the first angle and the first sensing value, calculates a second angle by using the first distance, a laser angle of view of the laser distance sensor, and a laser angle of view length of the laser distance sensor, rotates the laser distance sensor up to the second angle when a difference between the first angle and the second angle exceeds a predetermined range, acquires a second sensing value of the laser distance sensor, and operates the camera module based on the first sensing value or the second sensing value.

Each of the first angle and the second angle may be a tilt angle or a pan angle of the laser distance sensor, wherein the second angle may be an angle of the laser distance sensor at which the laser angle of view at least partially overlaps a center of a photographing area of the camera module.

The rotation of the laser distance sensor may be separate from the rotation of the camera module.

The monitoring system may further include a rotation driving module that rotates the laser distance sensor, wherein the rotation driving module may include a direct current (DC) motor, a solenoid, or a stepping motor, wherein, when the rotation driving module includes the DC motor or the solenoid, the processor may rotate the laser distance sensor at once from the first angle to the second angle, and when the rotation driving module includes the stepping motor, the processor may gradually rotate the laser distance sensor from the first angle to the second angle.

According to another aspect of the present disclosure, a method of operating a monitoring system including a camera module and a laser distance sensor arranged in a line with the camera module includes detecting an event, acquiring, in response to the event, a first angle of the laser distance sensor and a first sensing value that is a result obtained by sensing a distance to a subject through the laser distance sensor, calculating a first distance between the camera module and the subject by using the first angle and the first sensing value, calculating a second angle by using the first distance, a laser angle of view of the laser distance sensor, and a laser angle of view length of the laser distance sensor, comparing the first angle with the second angle, operating the camera module based on the first sensing value when a difference between the first angle and the second angle is within a predetermined range, and rotating the laser distance sensor up to the second angle when the difference between the first angle and the second angle exceeds the predetermined range, acquiring a second sensing value of the laser distance sensor, and operating the camera module based on the second sensing value.

According to embodiments of the present disclosure, it is possible to more accurately control the focusing of a camera.

It is to be understood that both the foregoing general description and the following detailed description are exemplary and explanatory and are intended to provide further explanation of the invention as claimed.

BRIEF DESCRIPTION OF DRAWINGS

The accompanying drawings, which are included to provide a further understanding of the invention and are incorporated in and constitute a part of this specification, illustrate exemplary embodiments of the invention, and together with the description serve to explain the inventive concepts.

DETAILED DESCRIPTION

Figure 1:
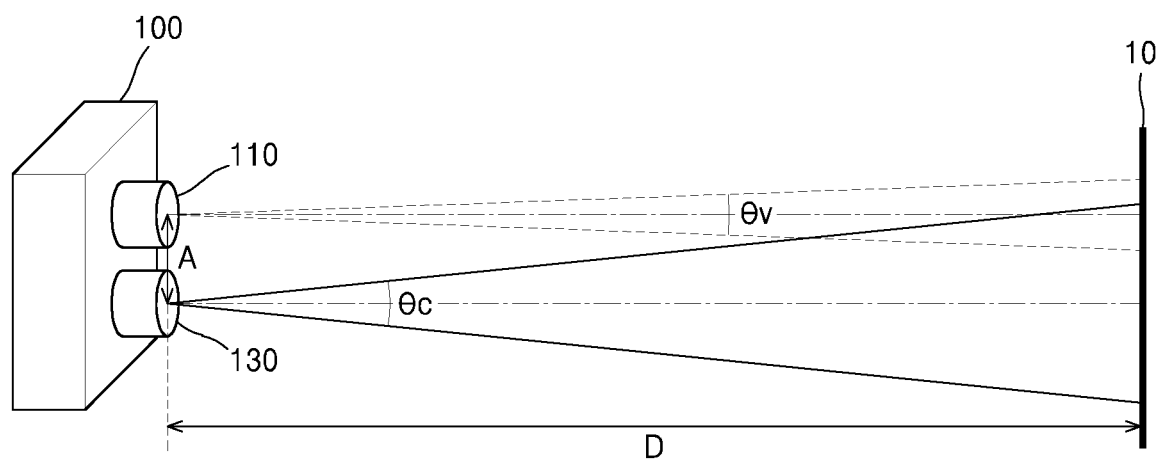
FIG. 1 is a diagram illustrating a laser angle of view of a laser distance sensor and a camera angle of view of a camera module according to an embodiment.

A monitoring system according to an embodiment of the present disclosure includes a camera module that photographs a subject, a laser distance sensor that senses a distance to the subject, the laser distance sensor being arranged in a line with the camera module, and a processor that acquires a first angle and a first sensing value of the laser distance sensor in response to an event, calculates a first distance between the camera module and the subject by using the first angle and the first sensing value, calculates a second angle by using the first distance, a laser angle of view of the laser distance sensor, and a laser angle of view length of the laser distance sensor, rotates the laser distance sensor up to the second angle when a difference between the first angle and the second angle exceeds a predetermined range, acquires a second sensing value of the laser distance sensor, and operates the camera module based on the first sensing value or the second sensing value.

As the inventive concept of the present disclosure allows for various changes and numerous embodiments, exemplary embodiments will be illustrated in the drawings and described in detail in the written description. However, this is not intended to limit the inventive concept of the present disclosure to particular modes of practice, and it is to be appreciated that all changes, equivalents, and substitutes that do not depart from the spirit and technical scope of the inventive concept of the present disclosure are encompassed in the inventive concept of the present disclosure. In the description of the inventive concept of the present disclosure, certain detailed explanations of the related art are omitted when it is deemed that they may unnecessarily obscure the essence of the inventive concept of the present disclosure.

While such terms as "first," "second," etc., may be used to describe various components, such components must not be limited to the above terms. The above terms are used only to distinguish one component from another.

The terms used in the present specification are merely used to describe exemplary embodiments, and are not intended to limit the inventive concept of the present disclosure. An expression used in the singular encompasses the expression of the plural, unless it has a clearly different meaning in the context. In the present specification, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added.

The inventive concept of the present disclosure may be described in terms of functional block components and various processing steps. Such functional blocks may be realized by any number of hardware and/or software components configured to perform the specified functions. For example, the inventive concept may employ various integrated circuit (IC) components, e.g., memory elements, processing elements, logic elements, look-up tables, and the like, which may carry out a variety of functions under the control of one or more microprocessors or other control devices. Similarly, where the elements of the inventive concept are implemented using software programming or software elements, the inventive concept may be implemented with any programming or scripting language such as C, C++, Java, assembler language, or the like, with the various algorithms being implemented with any combination of data structures, objects, processes, routines or other programming elements. Functional aspects may be implemented in algorithms that are executed on one or more processors. Furthermore, the inventive concept could employ any number of conventional techniques for electronics configuration, signal processing and/or control, data processing and the like. The words "mechanism," "element," "means," and "configuration" are used broadly and are not limited to mechanical or physical embodiments. The words can include software routines in conjunction with processors, etc.

Hereinafter, various embodiments are described in detail with reference to the accompanying drawings.

FIG. 1 is a diagram illustrating a laser angle of view of a laser distance sensor 110 and a camera angle of view of a camera module 130 according to an embodiment.

Figure 2:
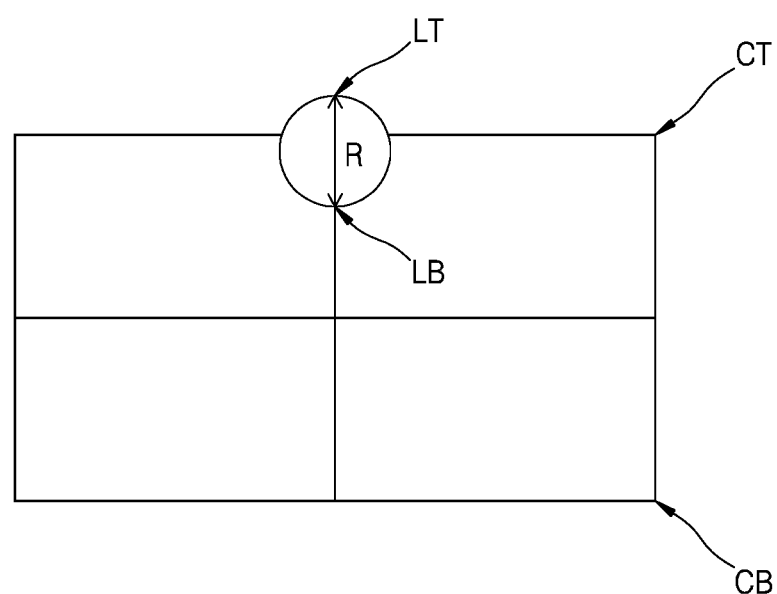
FIG. 2 is a diagram illustrating an irradiation area of a laser distance sensor and a photographing area of a camera module according to an embodiment.

FIG. 2 is a diagram illustrating an irradiation area of the laser distance sensor 110 and a photographing area of the camera module 130 according to an embodiment.

Referring to FIGS. 1 and 2, a monitoring system 100 may include the laser distance sensor 110 and the camera module 130.

The laser distance sensor 110 may be arranged in a line with the camera module 130.

The laser distance sensor 110 may be arranged in a line with the camera module 130 in a vertical direction. For example, the laser distance sensor 110 may be arranged in a line with the camera module 130 above the camera module 130, as shown in FIG. 1. In this case, the laser distance sensor 110 and the camera module 130 may be separated by a predetermined vertical distance A.

The laser distance sensor 110 may be arranged in a line with the camera module 130 in a horizontal direction. Although not shown in the drawings, for example, the laser distance sensor 110 may be arranged in a line with the camera module 130 on the left side of the camera module 130. In this case, the laser distance sensor 110 and the camera module 130 may be separated by a predetermined horizontal distance.

Hereinafter, operations of the laser distance sensor 110 and the camera module 130 arranged in a line in the vertical direction will be described in detail. Descriptions of the operations of the laser distance sensor 110 and the camera module 130 arranged in a line in the vertical direction below may be applied to operations of the laser distance sensor 110 and the camera module 130 arranged in a line in the horizontal direction.

The laser distance sensor 110 may be pan-rotated and/or tilt-rotated.

The camera module 130 may be pan-rotated and/or tilt-rotated. For example, the camera module 130 may be pan-rotated and/or tilt-rotated according to the movement of a subject.

The laser distance sensor 110 may be pan-rotated and/or tilt-rotated in the same manner as the camera module 130. In this case, a direction in which the laser distance sensor 110 faces and a direction in which the camera module 130 faces may always be the same.

The laser distance sensor 110 may be pan-rotated and/or tilt-rotated separately from the camera module 130. That is, the rotation of the laser distance sensor 110 may be separate from the rotation of the camera module 130. In this case, the direction in which the laser distance sensor 110 faces and the direction in which the camera module 130 faces may be the same or different.

For example, when a subject approaches the monitoring system 100, the laser distance sensor 110 may be tilt-rotated toward the subject, while the camera module 130 may be fixed without tilt rotation. In this case, the laser distance sensor 110 may have a predetermined tilt angle θT (see FIG. 3) based on the direction in which the camera module 130 faces.

Although not shown in the drawings, the laser distance sensor 110 may have a predetermined pan angle based on the direction in which the camera module 130 faces. The predetermined pan angle may be based on a laser horizontal angle of view length of the laser distance sensor 110. That is, a laser angle of view length may include a laser vertical angle of view length and/or a laser horizontal angle of view length.

Hereinafter, the relationship between the laser vertical angle of view length and the predetermined tilt angle will be described in detail. The following description of the relationship between the laser vertical angle of view length and the predetermined tilt angle may be applied to the relationship between the laser horizontal angle of view length and the predetermined pan angle.

The camera module 130 may adjust the zoom magnification of a lens. For example, when a subject approaches the monitoring system 100, the camera module 130 may perform a zoom-in operation toward the subject.

The laser distance sensor 110 may operate as a laser range finder (LRF). The laser distance sensor 110 may have a predetermined laser angle of view θv and sense a distance to a subject within the predetermined laser angle of view θv. That is, a sensing value of the laser distance sensor 110 may refer to a distance to a subject detected by the laser distance sensor 110.

The laser distance sensor 110 may perform pulsed time of flight (TOF) technology for sensing a distance by measuring the round trip time of a laser, and phase-shift technology for sensing a distance through the phase difference of the laser, but is not limited thereto.

The camera module 130 may perform a focusing operation based on a sensing value of the laser distance sensor 110. For example, when the sensing value is small, the camera module 130 may perform focusing on a near subject, and when the sensing value is large, the camera module 130 may perform focusing on a distant subject.

The camera module 130 may have a predetermined camera angle of view θc and may photograph a subject within the predetermined camera angle of view θc. That is, the camera module 130 may generate an image for a monitoring area defined by the predetermined camera angle of view θc. The camera module 130 may photograph a monitoring area in real time for monitoring or security purposes.

The predetermined laser angle of view θv and the predetermined camera angle of view θc may at least partially overlap each other. FIG. 2 shows a front view of a vertical plane 10 of a monitoring area, in which a circle indicates an irradiation area of the laser distance sensor 110 and a quadrangle indicates a photographing area of the camera module 130. That is, the circle may correspond to a predetermined laser angle of view θv, and the quadrangle may correspond to a predetermined camera angle of view θc.

When the predetermined laser field of view θv and the predetermined camera angle of view θc at least partially overlap each other, a laser upper position LT may not be included between a camera screen upper position CT and a camera screen lower position CB, and a laser lower position LB may be included between the camera screen upper position CT and the camera screen lower position CB.

The size of an area where the predetermined laser angle of view θv and the predetermined camera angle of view θc overlap each other may be determined according to a predetermined vertical distance A between the laser distance sensor 110 and the camera module 130, a predetermined horizontal distance D from the monitoring system 100 to the vertical plane 10, or a rotation angle of the laser distance sensor 110.

Laser irradiation efficiency may be determined according to the size of the area where the predetermined laser angle of view θv and the predetermined camera angle of view θc overlap each other. For example, the laser irradiation efficiency may be calculated using Equations 1 to 4.

$$R = D \times \tan\left(\text{RADIANS}\left(\frac{\theta_v}{2}\right)\right) \times 2 \qquad \text{[Equation 1]}$$

$$LT = A + D \times \tan\left(\text{RADIANS}((\theta_T)) + \frac{R}{2}\right) \qquad \text{[Equation 2]}$$

$$LB = A + D \times \tan(\text{RADIANS}(\theta_T)) - \frac{R}{2}$$

$$CT = D \times \tan\left(\text{RADIANS}\left(\frac{\theta_c}{2}\right)\right) \qquad \text{[Equation 3]}$$

$$CB = -CT$$

laser irradiation efficiency [Equation 4]

$$\text{laser irradiation efficiency} = \frac{\text{MIN}(CT, LT) - \text{MAX}(CB, LB)}{R}$$

Here, R is a laser irradiation diameter, D is a predetermined horizontal distance from the monitoring system 100 to the vertical plane 10, θv is a predetermined laser angle of view, LT is a laser upper position, A is a predetermined vertical distance between the laser distance sensor 110 and the camera module 130, OT is a predetermined tilt angle of the laser distance sensor 110 based on a direction in which the camera module 130 faces, LB is a laser lower position, CT is a camera screen upper position, θc is a predetermined camera angle of view, and CB is a camera screen lower position.

The laser irradiation efficiency may be improved as the size of an area where the irradiation area of the laser distance sensor 110 and the photographing area of the camera module 130 overlap each other increases. In particular, as the irradiation area of the laser distance sensor 110 is closer to the center of the photographing area of the camera module 130, the laser irradiation efficiency may be improved. To this end, the laser irradiation efficiency may be improved by controlling the predetermined tilt angle θT of the laser distance sensor 110 according to a distance from the monitoring system 100 to a subject, that is, the predetermined horizontal distance D.

Hereinafter, referring to FIG. 3, a method of calculating the predetermined tilt angle θT of the laser distance sensor 110 to increase or maintain laser irradiation efficiency when a distance from the monitoring system 100 to a subject is changed will be described in detail.

Figure 3:
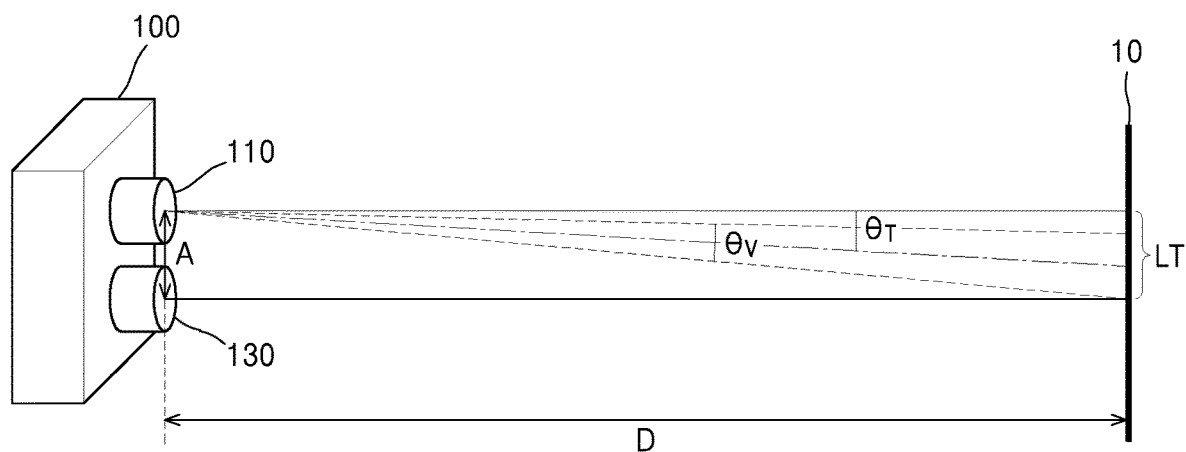
FIG. 3 is a diagram illustrating an angle for acquiring a sensing value of a laser distance sensor according to an embodiment.

FIG. 3 is a diagram illustrating an angle for acquiring a sensing value of a laser distance sensor according to an embodiment.

Referring to FIG. 3, in order for a laser angle of view θv to at least partially overlap the center of a photographing area of a camera based on a vertical plane 10, a laser distance sensor 110 may be rotated at a predetermined tilt angle θT.

The predetermined tilt angle θT may be calculated using Equations 5 to 7.

$$D = SI \times \cos\theta_1 \quad \text{[Equation 5]}$$

$$\tan\left(\theta_T + \frac{\theta_v}{2}\right) = \frac{LL}{D} \quad \text{[Equation 6]}$$

$$LL = A + m \quad \text{[Equation 7]}$$

Here, S1 is a first sensing value of the laser distance sensor 110, θ1 is a first angle of the laser distance sensor 110, LL is a laser vertical angle of view length of the laser distance sensor 110, and m is a margin value.

The predetermined tilt angle θT calculated from Equations 5 to 7 is represented by Equation 8.

$$\theta_T = \arctan\left(\frac{A+m}{D}\right) - \frac{\theta_v}{2} \quad \text{[Equation 8]}$$

In this case, the size of an area where the laser angle of view θv and the camera angle of view θc overlap each other may be determined according to the value of m. The value of m may be a predetermined value according to a user input or the like, but is not limited thereto.

In other words, when m=0, the laser lower position LB may be located at the center of the photographing area of the camera, and when m=LD/2, the laser lower position LB and the center of the laser upper position LT may be located at the center of the photographing area of the camera. In addition, when m=LD, the laser upper position LT may be located at the center of the photographing area of the camera. LD may refer to a laser vertical angle of view length according to the predetermined horizontal distance D of the laser distance sensor 110.

LD may be calculated by Equation 9.

$$LD = 2 \times D \times \tan\left(\frac{\theta_v}{2}\right) \quad \text{[Equation 9]}$$

Figure 4:
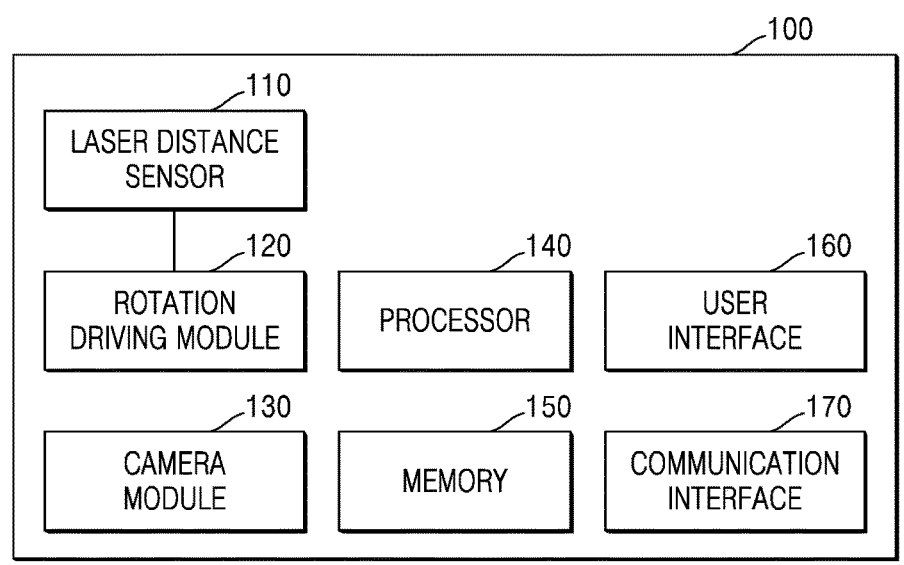
FIG. 4 is a block diagram of a monitoring system according to an embodiment.

FIG. 4 is a block diagram of a monitoring system 100 according to an embodiment.

Referring to FIG. 4, the monitoring system 100 according to the embodiment includes a laser distance sensor 110, a rotation driving module 120, a camera module 130, a processor 140, a memory 150, a user interface 160, and a communication interface 170.

Specifically, the monitoring system 100 according to the embodiment includes the camera module 130 for photographing a subject, the laser distance sensor 110 that is arranged in a line with the camera module 130 and senses a distance to the subject, and the processor 140 that acquires a first angle θ1 and a first sensing value S1 of the laser distance sensor 110 in response to an event, calculates a first distance between the camera module 130 and a subject by using the first angle θ1 and the first sensing value S1, and calculates a second angle θ2 by using the first distance, the laser angle of view θv of the laser distance sensor 110, and the laser vertical angle of view length LL of the laser distance sensor 110. In addition, the processor 140 rotates the laser distance sensor 110 up to the second angle θ2 when the difference between the first angle θ1 and the second angle θ2 exceeds a predetermined range, acquire a second sensing value S2 of the laser distance sensor 110, and operates the camera module 130 based on the first sensing value S1 or the second sensing value S2.

In this case, each of the first angle θ1 and the second angle θ2 may be a tilt angle or a pan angle of the laser distance sensor 110. The first angle θ1 may indicate the current tilt angle or the current pan angle of the laser distance sensor 110, and the second angle θ2 may indicate a reference tilt angle or a reference pan angle of the laser distance sensor 110.

The second angle θ2 may be an angle of the laser distance sensor 110 at which the laser angle of view θv at least partially overlaps the center of the photographing area of the camera module 130. The second angle θ2 may be, for example, a predetermined laser angle of view θv at which the laser lower position LB is located at the center of the photographing area of the camera.

In this case, the first sensing value S1 may be a distance value to a subject detected by the laser distance sensor 110 at the first angle θ1, and the second sensing value S2 may be a distance value to the subject detected by the laser distance sensor 110 at the second angle θ2.

The first distance between the camera module 130 and the subject may refer to a predetermined horizontal distance D from the monitoring system 100 of FIG. 3 to the vertical plane 10.

The laser vertical angle of view length LL may be a predetermined value according to a user input or the like. For example, in response to a user input for selecting the laser lower position LB to be located in the center of the photographing area of the camera, the laser vertical angle of view length LL may have the same value as a predetermined vertical distance A between the laser distance sensor 110 and the camera module 130.

The processor 140 may calculate the second angle θ2 by applying the first distance, the laser angle of view θv of the laser distance sensor 110, and the laser vertical angle of view length LL of the laser distance sensor 110 to Equation 8.

The processor 140 may compare the first angle θ1 with the second angle θ2. That is, the processor 140 may compare the current tilt angle of the laser distance sensor 110 with the reference tilt angle.

In detail, when the current tilt angle is within a reference range centered on the reference tilt angle, the processor 140 may control a focusing operating of the camera module 130 based on a first sensing value generated by the laser distance sensor 110 at the current tilt angle.

When the current tilt angle is outside the reference range centered on the reference tilt angle, the processor 140 may rotate the laser distance sensor 110 to reach the reference tilt angle, and may control a focusing operating of the camera module 130 based on a second sensing value generated by the laser distance sensor 110 at the reference tilt angle.

In this case, the rotation of the laser distance sensor 110 may be separate from the rotation of the camera module 130. The laser distance sensor 110 may be rotated by, for example, the rotation driving module 120, and the rotation driving module 120 may rotate the laser distance sensor 110 separately from the camera module 130.

The rotation driving module 120 may include a direct current (DC) motor, a solenoid, or a stepping motor.

The DC motor may include a permanent magnet and a coil and may generate a rotational force by changing the direction of a current flowing through the coil. The processor 140 may rotate the laser distance sensor 110 from the first angle θ1 to the second angle θ2 at once by operating the DC motor.

The solenoid may include an internal iron core and a coil, and when current flows through the coil wound in a cylindrical shape, a stronger magnetic field may be generated due to the internal iron core. The processor 140 may rotate the laser distance sensor 110 from the first angle θ1 to the second angle θ2 at once by operating the solenoid.

The stepping motor may include a plurality of serrated electromagnets arranged around a metal gear, and power may be sequentially applied to the plurality of serrated electromagnets. The processor 140 may gradually rotate the laser distance sensor 110 from the first angle θ1 to the second angle θ2 by operating the stepping motor.

The stepping motor may be a variable reluctance (VR) type stepping motor, a permanent (PM) type stepping motor, a hybrid (HB) type stepping motor, or the like, but is not limited thereto.

The memory 150 may store constants such as the laser angle of view θv of the laser distance sensor 110 and the predetermined vertical distance A between the laser distance sensor 110 and the camera module 130.

The memory 150 may store variables such as the laser vertical angle of view length LL and the second angle θ2 of the laser distance sensor 110.

The user interface 160 may receive a user input. For example, the user interface 160 may receive a user input for selecting a location of a photographing area of a camera at the laser upper position LT and/or the laser lower position LB, a sensor angle, and the like.

The communication interface 160 may communicate with the outside. For example, the communication interface 160 may transmit information of the monitoring system 100 to an external server or may receive a command from an external server.

Hereinafter, a distance sensing operation of the monitoring system 100 in a manual sensing mode will be described with reference to FIG. 5, and a distance sensing operation of the monitoring system 100 in an automatic sensing mode will be described with reference to FIG. 6.

Figure 5:
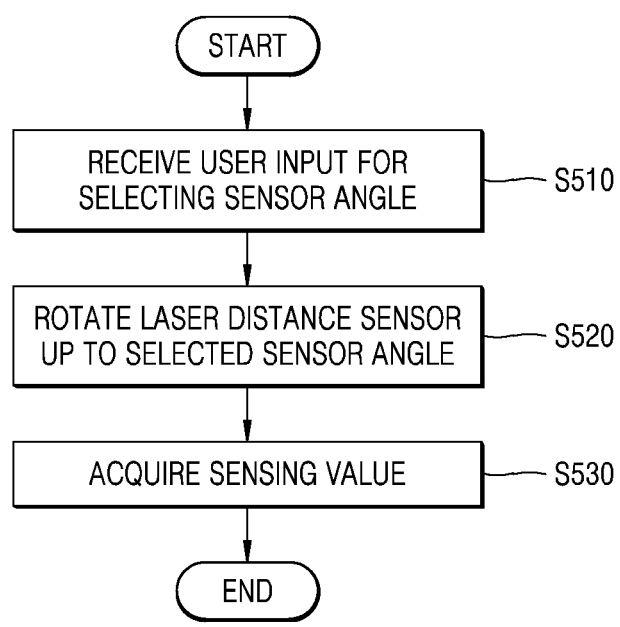
FIG. 5 is a flowchart illustrating a manual sensing operation of a monitoring system according to an embodiment.

FIG. 5 is a flowchart illustrating a manual sensing operation of the monitoring system 100 according to an embodiment.

Referring to FIG. 5, the monitoring system 100 including the camera module 130 and the laser distance sensor 110 arranged in a line with the camera module 130 receives a user input for selecting a sensor angle, via the user interface 160 (operation S510).

The sensor angle may refer to an angle of the laser distance sensor 110 to the camera module 130.

Subsequently, the processor 140 of the monitoring system 100 controls the rotation driving module 120 to thereby rotate the laser distance sensor 110 up to the sensor angle selected by the user input (operation S520).

Subsequently, the processor 140 of the monitoring system 100 acquires a sensing value obtained by sensing a distance to a subject through the laser distance sensor 110 having the sensor angle selected by the user input (operation S530).

Accordingly, the monitoring system 100 according to the embodiment may provide a captured image more accurately focused on a subject desired by a user.

Figure 6:
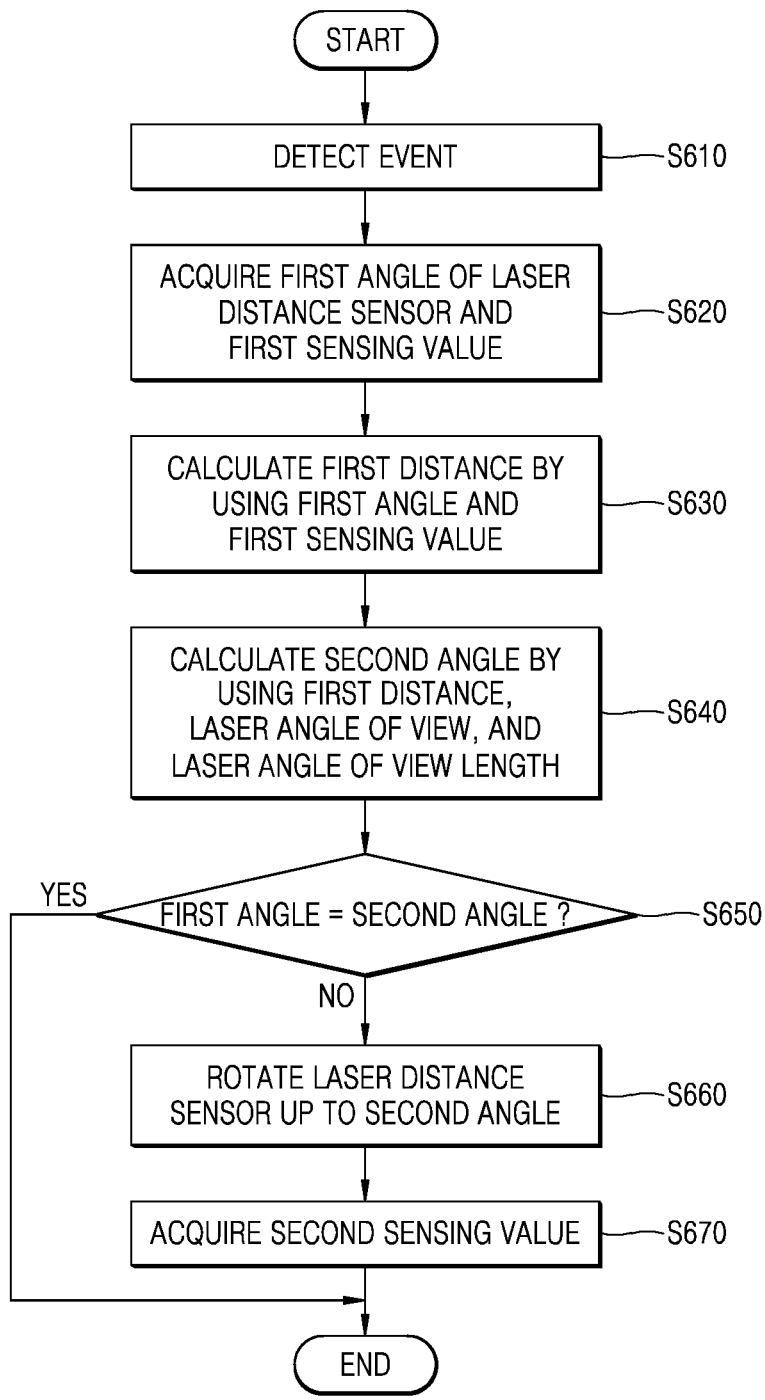
FIG. 6 is a flowchart illustrating an automatic sensing operation of a monitoring system according to an embodiment.

FIG. 6 is a flowchart illustrating an automatic sensing operation of the monitoring system 100 according to an embodiment.

Referring to FIG. 6, the monitoring system 100 including the camera module 130 and the laser distance sensor 110 arranged in a line with the camera module 130 detects an event through the processor 140 (operation S610).

The event may be detected by the camera module 130. For example, the event may be a movement in an image captured by the camera module 130, a movement of a predetermined subject, or the like.

The event may be detected by components other than the camera module 130. For example, the event may be a predetermined audio signal or the like.

Subsequently, in response to the event, the processor 140 senses the first angle θ1 of the laser distance sensor 110 and the first sensing value S1 that is a result obtained by sensing a distance to a subject through the laser distance sensor 110 (operation S620).

The processor 140 calculates a first distance between the camera module 130 and the subject by using the first angle θ1 and the first sensing value S1 (operation S630).

The processor 140 may calculate a first distance between the camera module 130 and the subject from the first angle θ1 and the first sensing value S1 by using Equation 5.

Subsequently, the processor 140 calculates the second angle θ2 by using the first distance, the laser angle of view θv of the laser distance sensor 110, and the laser angle of view length of the laser distance sensor 110 (operation S640). For example, the processor 140 may calculate the second angle θ2 by using the first distance, the laser angle of view θv of the laser distance sensor 110, and the laser vertical angle of view length LL of the laser distance sensor 110.

The processor 140 may calculate the second angle θ2 from the first distance, the laser angle of view θv of the laser distance sensor 110, and the laser vertical angle of view length LL of the laser distance sensor 110 by using Equations 5 to 8.

The processor 140 compares the first angle θ1 with the second angle θ2 (operation S650).

When the difference between the first angle θ1 and the second angle θ2 is within a predetermined range (operation S650), the processor 140 ends the operation of the laser distance sensor 110.

In this case, the processor 140 operates the camera module 130 based on the first sensing value S1.

When the difference between the first angle θ1 and the second angle θ2 exceeds the predetermined range (operation S650), the processor 140 rotates the laser distance sensor 110 up to the second angle θ2 (operation S660), and acquires the second sensing value S2 of the laser distance sensor 110 (operation S670).

That is, the second sensing value S2 may be a sensing value generated by the laser distance sensor 110 at the second angle θ2.

In this case, the processor 140 operates the camera module 130 based on the second sensing value S2.

Focusing of the camera module 130 based on the first sensing value S1 and focusing of the camera module 130 based on the second sensing value S2 may be performed differently. That is, because focusing of the camera module 130 may be automatically performed based on a distance to a subject, more detailed focusing may be performed.

The inventive concept of the present disclosure has been particularly shown and described above with reference to exemplary embodiments thereof. It will be understood by those skilled in the art that various changes in form and details may be made therein without departing from the spirit and scope of the inventive concept as defined by the appended claims.

However, the embodiments described above should be considered in descriptive sense only and not for purposes of limitation. The scope of the inventive concept of the present disclosure is defined not by the detailed description of the inventive concept but by the appended claims, and the inventive concept as defined by the claims and equivalents thereof will be construed as being included in the inventive concept.

The invention claimed is:

1. A monitoring system comprising:
a camera module configured to photograph a subject;
a laser distance sensor that configured to sense a distance to the subject, the laser distance sensor being arranged in a line with the camera module; and
a processor configured to acquire a first angle and a first sensing value of the laser distance sensor in response to an event, calculate a first distance between the camera module and the subject by using the first angle and the first sensing value, calculate a second angle by using the first distance, a laser angle of view of the laser distance sensor, and a laser angle of view length of the laser distance sensor, rotate the laser distance sensor up to the second angle when a difference between the first angle and the second angle exceeds a predetermined range, acquire a second sensing value of the laser distance sensor, and operate the camera module based on the first sensing value or the second sensing value.

2. The monitoring system of claim 1, wherein each of the first angle and the second angle is a tilt angle or a pan angle of the laser distance sensor,
wherein the second angle is an angle of the laser distance sensor at which the laser angle of view at least partially overlaps the center of a photographing area of the camera module.

3. The monitoring system of claim 1, wherein the rotation of the laser distance sensor is separate from the rotation of the camera module.

4. The monitoring system of claim 3, further comprising:
a rotation driving module configured to rotate the laser distance sensor,
wherein the rotation driving module includes a direct current (DC) motor, a solenoid, or a stepping motor,
wherein, when the rotation driving module includes the DC motor or the solenoid, the processor rotates the laser distance sensor at once from the first angle to the second angle, and when the rotation driving module includes the stepping motor, the processor gradually rotates the laser distance sensor from the first angle to the second angle.

5. The monitoring system of claim 1, wherein
the processor calculates the second angle based on the first distance, the laser angle of view, and the laser angle of view length by using the following equation:

second angle=arctan(laser angle of view length/first distance)−(laser angle of view/2).

6. A method of operating a monitoring system including a camera module and a laser distance sensor arranged in a line with the camera module, the method comprising:
detecting an event;
acquiring, in response to the event, a first angle of the laser distance sensor and a first sensing value that is a result obtained by sensing a distance to a subject through the laser distance sensor;
calculating a first distance between the camera module and the subject by using the first angle and the first sensing value;
calculating a second angle by using the first distance, a laser angle of view of the laser distance sensor, and a laser angle of view length of the laser distance sensor;
comparing the first angle with the second angle;
operating the camera module based on the first sensing value when a difference between the first angle and the second angle is within a predetermined range; and
rotating the laser distance sensor up to the second angle when the difference between the first angle and the second angle exceeds the predetermined range, acquiring a second sensing value of the laser distance sensor, and operating the camera module based on the second sensing value.

7. The method of claim 6, wherein each of the first angle and the second angle is a tilt angle or a pan angle of the laser distance sensor,
wherein the second angle is an angle of the laser distance sensor at which the laser angle of view at least partially overlaps a center of a photographing area of the camera module.

8. The method of claim 6, wherein the rotation of the laser distance sensor is separate from the rotation of the camera module.

9. The method of claim 8,
wherein the laser distance sensor is rotated by a rotation driving module,
wherein the rotation driving module includes a direct current (DC) motor, a solenoid, or a stepping motor,
wherein, when the rotation driving module includes the DC motor or the solenoid, the laser distance sensor rotates at once from the first angle to the second angle, and when the rotation driving module includes the stepping motor, the laser distance sensor gradually rotates from the first angle to the second angle.

10. The method of claim 6, wherein the calculating of the second angle includes:
calculating the second angle by using the following equation:

second angle=arctan(laser angle of view length/first distance)−(laser angle of view/2).

* * * * *